US008234671B2

(12) United States Patent
Ku et al.

(10) Patent No.: US 8,234,671 B2
(45) Date of Patent: Jul. 31, 2012

(54) BROADCAST TERMINAL AND FAVORITE BROADCAST PROGRAM NOTIFICATION METHOD FOR THE SAME

(75) Inventors: Ji Yeong Ku, Seoul (KR); Seung Kyo Seo, Seoul (KR)

(73) Assignee: LG Electronics Inc., Seoul (KR)

(*) Notice: Subject to any disclaimer, the term of this patent is extended or adjusted under 35 U.S.C. 154(b) by 913 days.

(21) Appl. No.: 11/961,832

(22) Filed: Dec. 20, 2007

(65) Prior Publication Data

US 2008/0155604 A1 Jun. 26, 2008

(30) Foreign Application Priority Data

Dec. 22, 2006 (KR) ........................ 10-2006-0132772

(51) Int. Cl.
*H04N 7/10* (2006.01)
*G06F 3/00* (2006.01)
*G06F 13/00* (2006.01)

(52) U.S. Cl. ............................................ 725/46; 725/39

(58) Field of Classification Search .............. 725/37–59, 725/68, 100, 131, 139, 151
See application file for complete search history.

(56) References Cited

U.S. PATENT DOCUMENTS 5,635,989 A * 6/1997 Rothmuller ..................... 725/46
6,456,338 B1 * 9/2002 Yuen ............................ 348/731
6,973,663 B1 * 12/2005 Brown et al. .................. 725/39
2003/0066079 A1 4/2003 Suga
2003/0200545 A1 10/2003 Nakada
2004/0083490 A1 4/2004 Hane
2005/0246732 A1 11/2005 Dudkiewicz et al.
2006/0037045 A1 * 2/2006 Hsieh ............................ 725/43
2006/0064724 A1 3/2006 Kwon et al.
2007/0136752 A1 * 6/2007 Sanders .......................... 725/46
2007/0157247 A1 * 7/2007 Cordray et al. ................ 725/47
2008/0092181 A1 * 4/2008 Britt ................................ 725/87

FOREIGN PATENT DOCUMENTS

CN 1339222 A 3/2002
CN 1361628 A 7/2002
EP 1 158 793 A2 11/2001
EP 1 300 781 A2 10/2002
KR 10-2006-0008389 A 1/2006
KR 10-2006-0099182 A 9/2006
WO WO 02/082698 A2 10/2002

OTHER PUBLICATIONS

Britt, U.S. Appl. No. 60/813,479, filed Jun. 13, 2006 [incorporated by reference].*

* cited by examiner

*Primary Examiner* — Scott Beliveau
*Assistant Examiner* — Yassin Alata
(74) *Attorney, Agent, or Firm* — Birch, Stewart, Kolasch & Birch, LLP

(57) ABSTRACT

A broadcast terminal including a broadcast receiver configured to receive an Electronic Program Guide (EPG) including broadcast program information about a plurality of broadcast programs, a display configured to display any one of the plurality of broadcast programs, an input unit configured to input a selection signal to select one of the plurality of broadcast programs, and a controller configured to extract broadcast program information included in the EPG that corresponds to the selected broadcast program and to store the extracted broadcast program information as a favorite broadcast program information in a memory of the broadcast terminal.

14 Claims, 11 Drawing Sheets

BROADCAST TERMINAL AND FAVORITE BROADCAST PROGRAM NOTIFICATION METHOD FOR THE SAME

This application claims the benefit of Korean Patent Application No. 10-2006-0132772, filed on Dec. 22, 2006, which is hereby incorporated by reference as if fully set forth herein.

BACKGROUND OF THE INVENTION

1. Field of the Invention

The present invention relates to a broadcast terminal and corresponding method pertaining to storing, searching and displaying information related to favorite broadcast programs.

2. Discussion of the Related Art

Mobile terminals now provide many additional functions besides the basic call function. For example, users can now access the Internet, send and receive text and voice messages, watch videos and other broadcasts, perform scheduling tasks, etc. using their mobile terminal.

In more detail, users can now watch several different broadcast programs such as movies, sporting events, television programs, news programs, etc. on their terminals. However, the users are only able to watch a program that is currently being broadcast and has to manually search information about when a desired program is to be broadcast, and then manually enter the terminal into a broadcast mode at the time of the broadcast so they can view the broadcast. This procedure is often cumbersome and time consuming.

SUMMARY OF THE INVENTION

Accordingly, one object of the present invention is to address the above-noted and other problems.

Another object of the present invention is to provide a broadcast terminal and corresponding method that allows a user to select particular broadcast programs as their favorite broadcast programs, and have a program search program guide information to notify the user when one of their favorite broadcast programs is going to be broadcast.

Another object of the present invention is to store information on the broadcast terminal about a user's favorite broadcast programs and to notify the user when their favorite broadcast programs are to be broadcast.

Yet another object of the present invention is to notify the user when one of their favorite broadcasts is to be rerun (rebroadcast) or when a next episode in a series of episodes is to be broadcast.

To achieve these and other advantages and in accordance with the purpose of the present invention, as embodied and broadly described herein, the present invention provides in one aspect a broadcast terminal including a broadcast receiver configured to receive an Electronic Program Guide (EPG) including broadcast program information about a plurality of broadcast programs, a display configured to display any one of the plurality of broadcast programs, an input unit configured to input a selection signal to select one of the plurality of broadcast programs, and a controller configured to extract broadcast program information included in the EPG that corresponds to the selected broadcast program and to store the extracted broadcast program information as a favorite broadcast program information in a memory of the broadcast terminal. The present invention also provides a corresponding broadcasting method.

In another aspect, the present invention provides a broadcast terminal including a broadcast receiver configured to receive an Electronic Program Guide (EPG) including broadcast program information about a plurality of broadcast programs, a display configured to display one of the plurality of broadcast programs, an input unit configured to input a search signal to search for previously stored favorite broadcast program information, and a controller configured to search the EPS for broadcast program information included in the EPG that corresponds to the selected favorite broadcast program information, and to display the selected favorite broadcast program information. The present invention also provides a corresponding broadcasting method.

In yet another aspect, the present invention provides a broadcast terminal including a broadcast receiver configured to receive an Electronic Program Guide (EPG) including broadcast program information about a plurality of broadcast programs, a display configured to display any one of the plurality of broadcast programs, an input unit configured to input a search signal to search for previously stored favorite broadcast program information, and a controller configured to search the EPG for broadcast program information included in the EPG that corresponds to the selected favorite broadcast program information, and to display the selected favorite broadcast program information. The present invention also provides a corresponding broadcasting method.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Broadcast programs are provided to mobile terminals via different broadcasting networks. Thus, the user is now able to watch different broadcast programs while they are riding the subway, taking a bus, waiting for a doctor's appointment, etc. The broadcasting network also broadcast an Electronic Program Guide (EPG) to the mobile terminals so the user can view the EPG to see what different broadcast programs are being broadcast and what time the broadcast programs will be broadcast.

In more detail, the EPG includes broadcast program guide information for each channel in an electronic document format. The EPG includes a variety of information associated with broadcast programs including the title and broadcast time, the actors or other celebrities involved with the broadcast program, a type of the broadcast program (e.g., drama, comedy, sporting event, news channel), a synopsis of the broadcast program, and a producer of each broadcast program. Therefore, the user can view this information to determine if he or she wants to view the broadcast on their terminal.

The present invention advantageously allows a user to select particular broadcast programs as their favorite broadcast programs and then have a program perform a variety of different operations related to their favorite broadcast programs (e.g., to search for their upcoming favorite broadcast programs, to notify the user about upcoming broadcasts, etc.). These features will be discussed in more detail below with respect to the figures.

In addition, examples of digital broadcast systems include the European Digital Audio Broadcasting (DAB) system based on the Eureka-147 (ETSI EN 300 401) standard, the Digital Video Broadcasting-Handheld (DVB-H) system, the MediaFlo system developed by the US company Qualcomm, and the Korean Digital Multimedia Broadcasting (DMB) system. The broadcast terminal according to embodiments of the present invention includes any type of terminal that can receive digital broadcasts such as a PDA, a PMP, a mobile phone, a smart phone, a digital TV, a game console, etc. The following description refers to a broadcast terminal in the DMB system, but the present invention can be applied to any broadcast terminal.

Figure 1:
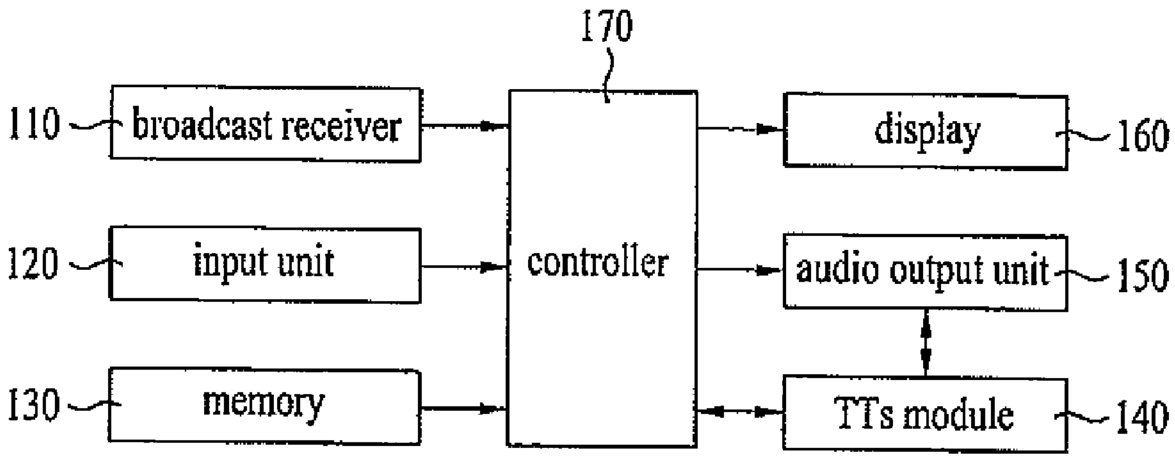
FIG. 1 is a block diagram illustrating a broadcast terminal according to an embodiment of the present invention.

In more detail, FIG. 1 is a block diagram illustrating a broadcast terminal according to an embodiment of the present invention. As shown, the broadcast terminal includes a broadcast receiver 110, an input unit 120, a memory 130, a Text-To-Speech (TTS) module 140, an audio output unit 150, a display unit 160 and a controller 170.

The broadcast receiver 110 receives a broadcast signal from a broadcast center, demultiplexes the broadcast signal into text, video and audio, and decodes the demultiplexed text, video and audio. The broadcast receiver 110 also receives and decodes EPG data including a plurality of broadcast program information from the broadcast center.

Further the input unit 120 includes a plurality of number and function keys and outputs key signals corresponding to selected keys to the controller 170. Preferably, the input unit 120 is a touchpad or a touch screen depending on the configuration of the broadcast terminal. In addition, the memory 130 stores one or more programs to control an overall operation of the broadcast terminal and a variety of data input and output to the terminal when the broadcast terminal is operated.

The memory 130 also stores favorite broadcast program information registered by the user. Further, the favorite broadcast program information includes a variety of information such as a title, broadcast time, a name of a favorite sports team, a producer of the program, and an actor or celebrity associated with the broadcast program that the user frequently views (i.e., that the user has set as a favorite broadcast program).

In addition, the Text-To-Speech (TTS) module 140 converts text into a preset language (e.g., English) and outputs the speech to the audio output unit 150. In more detail, the TTs module 140 extracts text from the broadcast program information retrieved by the controller 170 and converts the extracted text into speech.

Further, the audio output unit 150 converts the audio decoded by the broadcast receiver 110 into an audio frequency (AF) sound and outputs the AF sound. The audio output unit 150 is also used to notify the user of the presence of a favorite broadcast program (e.g., by outputting an alarm signal). The audio output unit 150 also outputs the speech converted by the TTs module 140.

In addition, the display unit 160 displays data corresponding to a key signal from the input unit 120, and displays a variety of information and the operating state of the broadcast terminal in the form of icons and text. The display unit 160 also displays the broadcast text, the broadcast video, the EPG decoded by the broadcast receiver 110, and the broadcast program information retrieved by the controller 170. Further, the controller 170 controls the overall operation of the broadcast terminal.

Reference will now be made in detail to the embodiments of the present invention performed by the controller 170 according to the present invention.

FIRST EMBODIMENT

Figure 2:
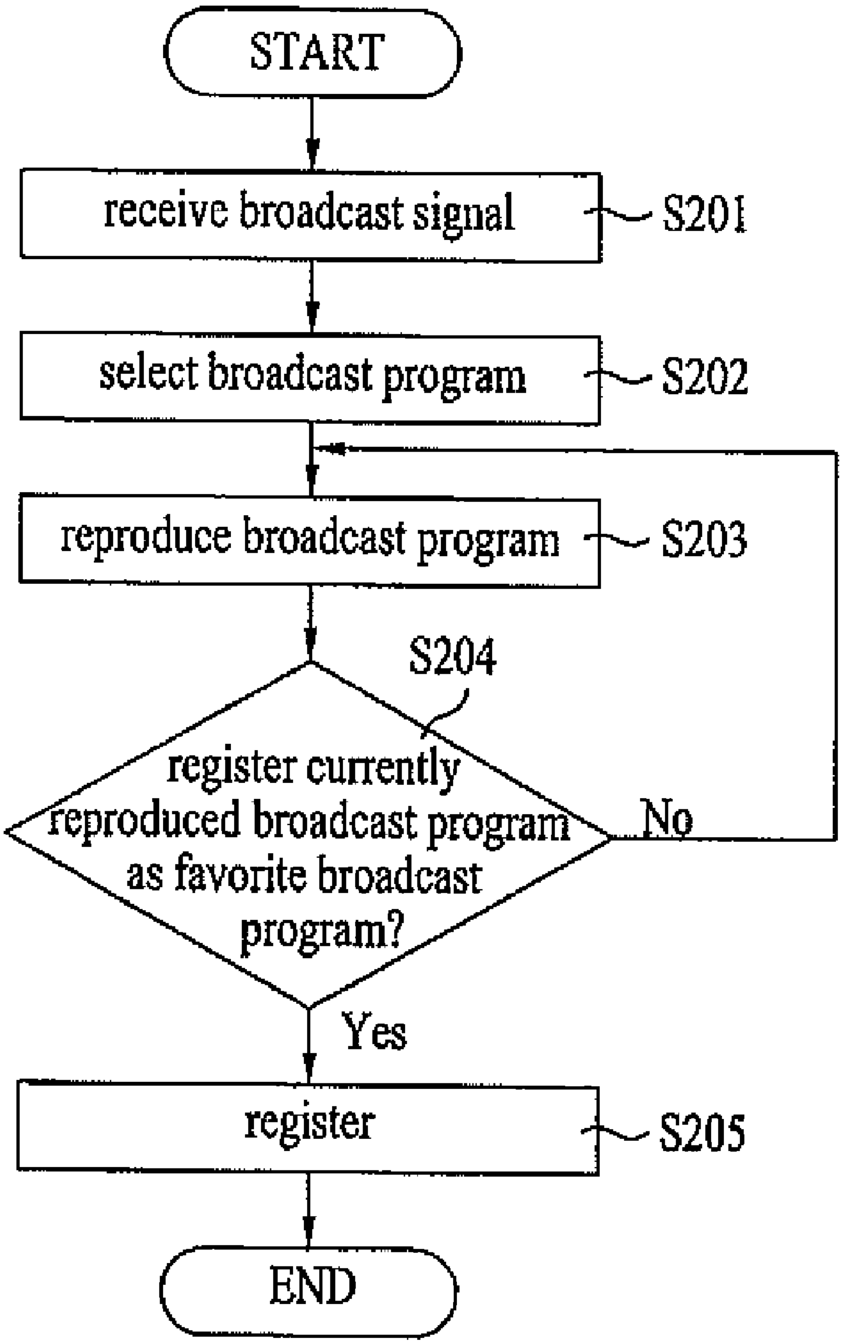
FIG. 2 is a flowchart illustrating a method of registering a favorite broadcast program according to an embodiment of the present invention.

FIG. 2 is a flowchart illustrating a method of registering a favorite broadcast program according to an embodiment of the present invention, and FIGS. 3A-3D are overviews illustrating example screenshots of a broadcast terminal registering a favorite broadcasting program according to an embodiment of the present invention. These figures as well as FIG. 1 will be referred to in describing the features of the first embodiment.

As shown in FIG. 2, the controller 170 controls the broadcast receiver 110 to receive a broadcast signal (S201). That is, when the user inputs a key signal to enter a broadcast playback mode through the input unit 120, the controller 170 switches the operating mode of the broadcast terminal to the broadcast playback mode such that the broadcast terminal can receive the broadcast terminal.

Figure 3A:
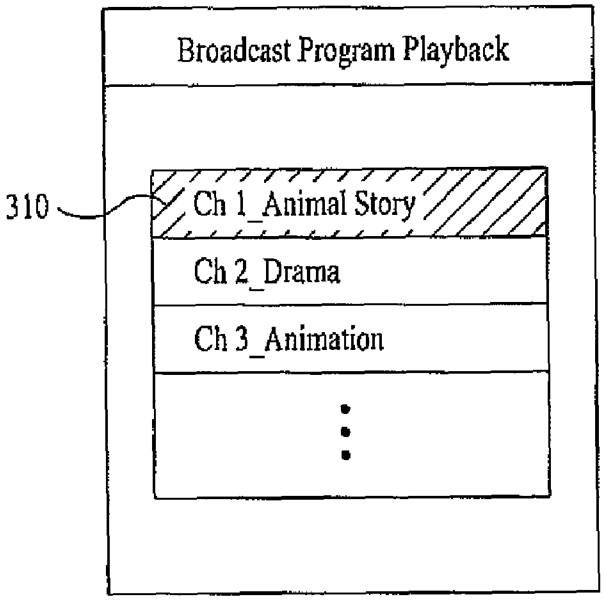
FIGS. 3A-3D are overviews illustrating example screenshots of a broadcast terminal registering a favorite broadcasting program according to an embodiment of the present invention.
Figure 3B:
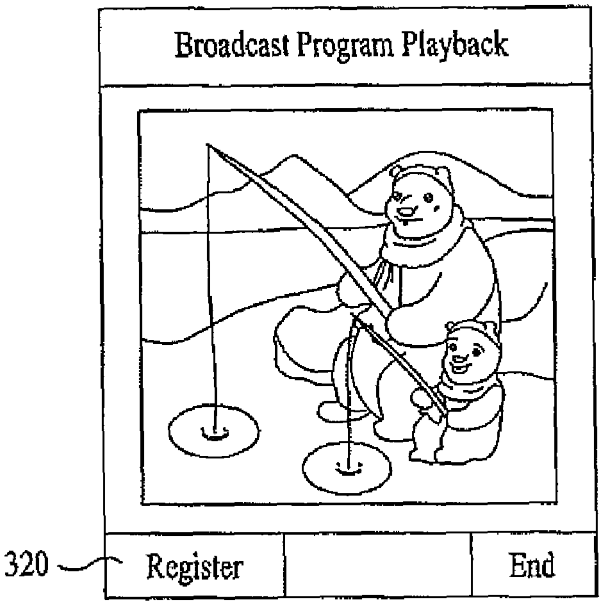

The controller 170 then displays a list of broadcast programs that the user can view on their terminal. For example, FIG. 3A illustrates such a list of broadcast programs. When the user selects a broadcast program from the list such as the program "Ch 1_Animal Story" 310 in FIG. 3A, the controller 170 reproduces the selected broadcast program (S202 and S203). For example, FIG. 3B illustrates the controller 170 reproducing the selected program "Ch 1_Animal Story" 310.

Then, the controller 170 determines if the user selects or touches a register key 320 (see FIG. 3B) to register the currently reproduced program "Ch 1_Animal Story" 310 as a favorite broadcast program. If the user has selected the register key 320 (Yes in S204), then the controller 170 registers the program "Ch 1_Animal Story" 310 as favorite broadcast program information in the memory 130 (S205).

In more detail, the controller 170 extracts information about the program "Ch 1_Animal Story" 310 from the EPG that has already been received or is currently being received through the broadcast receiver 110 and then stores the extracted information as the favorite broadcast program information in the memory 130. For example, the controller 170 may extract information such as the title, broadcast time, celebrity or other personality, and producer of the program "Ch 1_Animal Story" 310 from the EPG and then store the extracted information as favorite broadcast program information in the memory 130. Other information from the EPO may also be stored as the favorite broadcast program information.

Figure 3C:
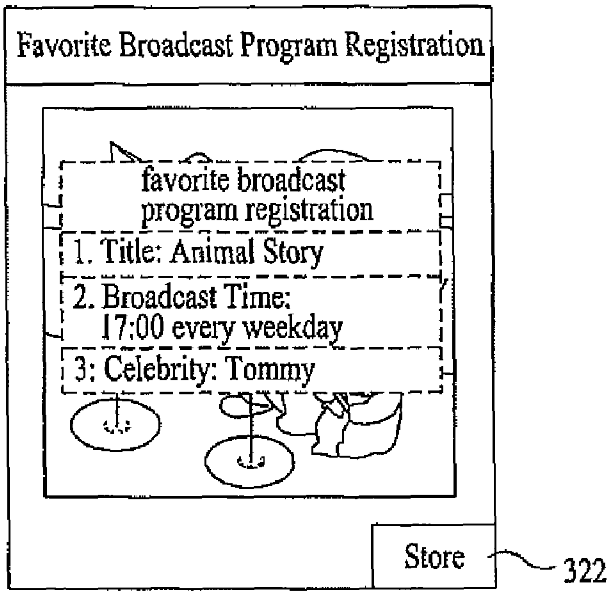

In addition, as shown in FIG. 3C, when the user selects the register key 320 to register the program "Ch 1_Animal Story" 310 as favorite broadcast program information, the controller 170 displays a program information input window on the display unit 160 that includes information about the registered program "Ch 1_Animal Story" 310. Note that the information shown corresponds to the information extracted from the EPG, and the user can verify that the information is correct. The user can also change information displayed in the input window using the input unit 120.

Figure 3D:
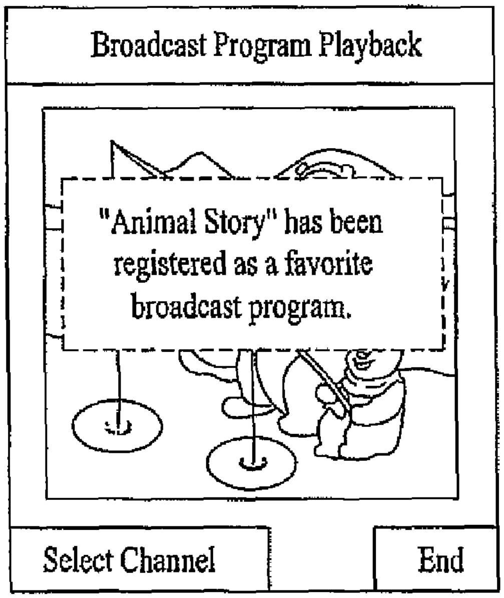

Thereafter, the user can select the Store button 322 to store the information in the memory 130. As shown in FIG. 3D, the controller then notifies the user the broadcast program information has been successful registered.

Figure 4:
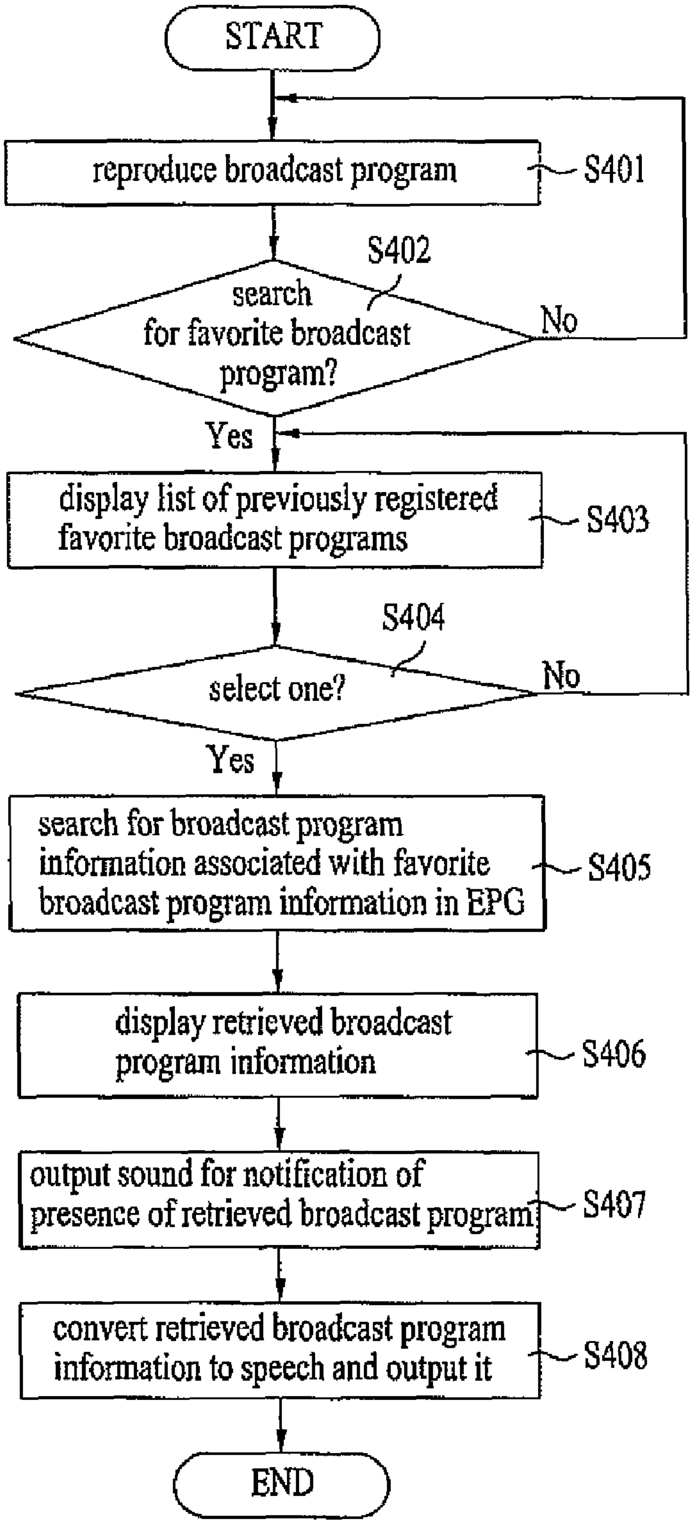
FIG. 4 is a flowchart illustrating a method of searching for a favorite broadcast program according to an embodiment of the present invention.

Next, FIG. 4 is a flowchart illustrating a method of searching for a favorite broadcast program according to an embodiment of the present invention, and FIGS. 5A-5E are overviews illustrating example screenshots of a broadcast terminal searching for a favorite broadcast program according to an embodiment of the present invention. These figures as well as FIG. 1 will be referred to in describing the features of searching for a favorite broadcast program according to the first embodiment.

Figure 5A:
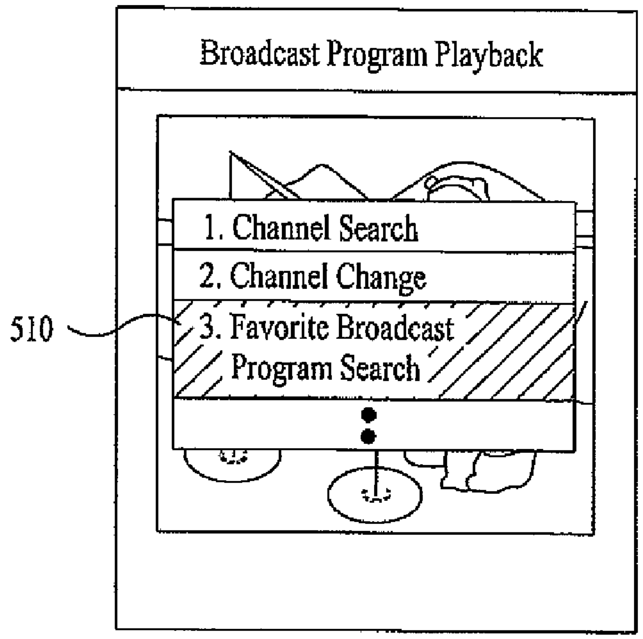
FIGS. 5A-5E are overviews illustrating example screenshots of a broadcast terminal searching for a favorite broadcast program according to an embodiment of the present invention.
Figure 5B:
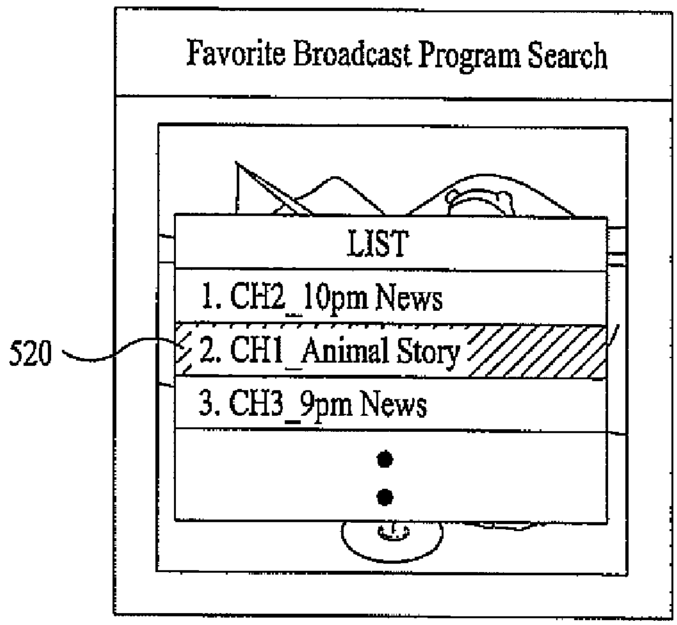

As shown in FIG. 4, the controller 170 reproduces a broadcast program carried in a broadcast signal received from the broadcast receiver 110 (S401). This is similar to step S203 in FIG. 2. Then, the controller 170 determines if the user selects or touches a favorite broadcast program search option 510 (see FIG. 5A) to search for favorite broadcast program information while the current broadcast program is being reproduced (S402). When the user has selected the search option 510 (Yes in S402), the controller 170 displays a list of favorite broadcast program information that was previously registered in the memory 130 through the procedure of FIGS. 2 and 3A-3D on the display unit 150 as shown in FIG. 5B (S403).

Figure 5C:
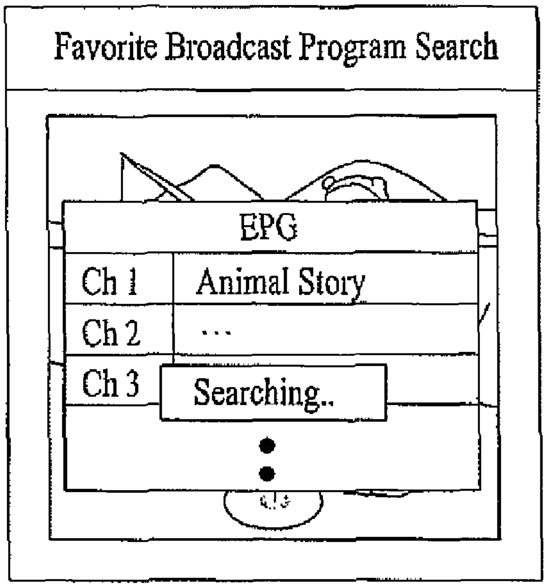

The controller 170 then determines if the user selects one of the displayed favorite broadcast programs (S404). If, as shown in FIG. 5B, the user selects the program "Ch 1_Animal Story" 520 from the favorite broadcast program information list using the input unit 120 (Yes in S404), the controller 170 searches for broadcast program information associated with the program "Ch 1_Animal Story" 520 in the EPG received through the broadcast receiver 110 as shown in FIG. 5C (S405).

More specifically, the controller 170 searches for broadcast program information including at least one of the title, broadcast time, and celebrity of the program "Ch 1_Animal Story" 520 in a plurality of broadcast program information in the EPG, thereby retrieving broadcast program information corresponding to a rerun or any other available episode of the program "Ch 1_Animal Story" 520, for example.

Figure 5D:
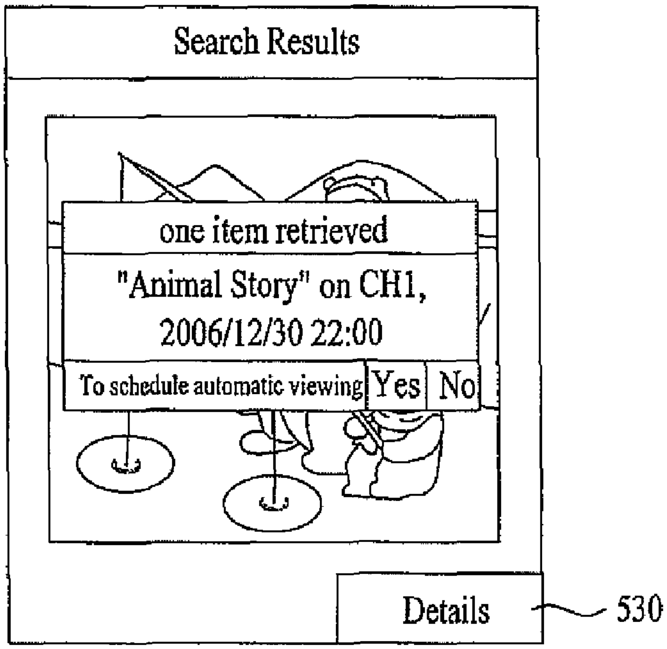
Figure 5E:
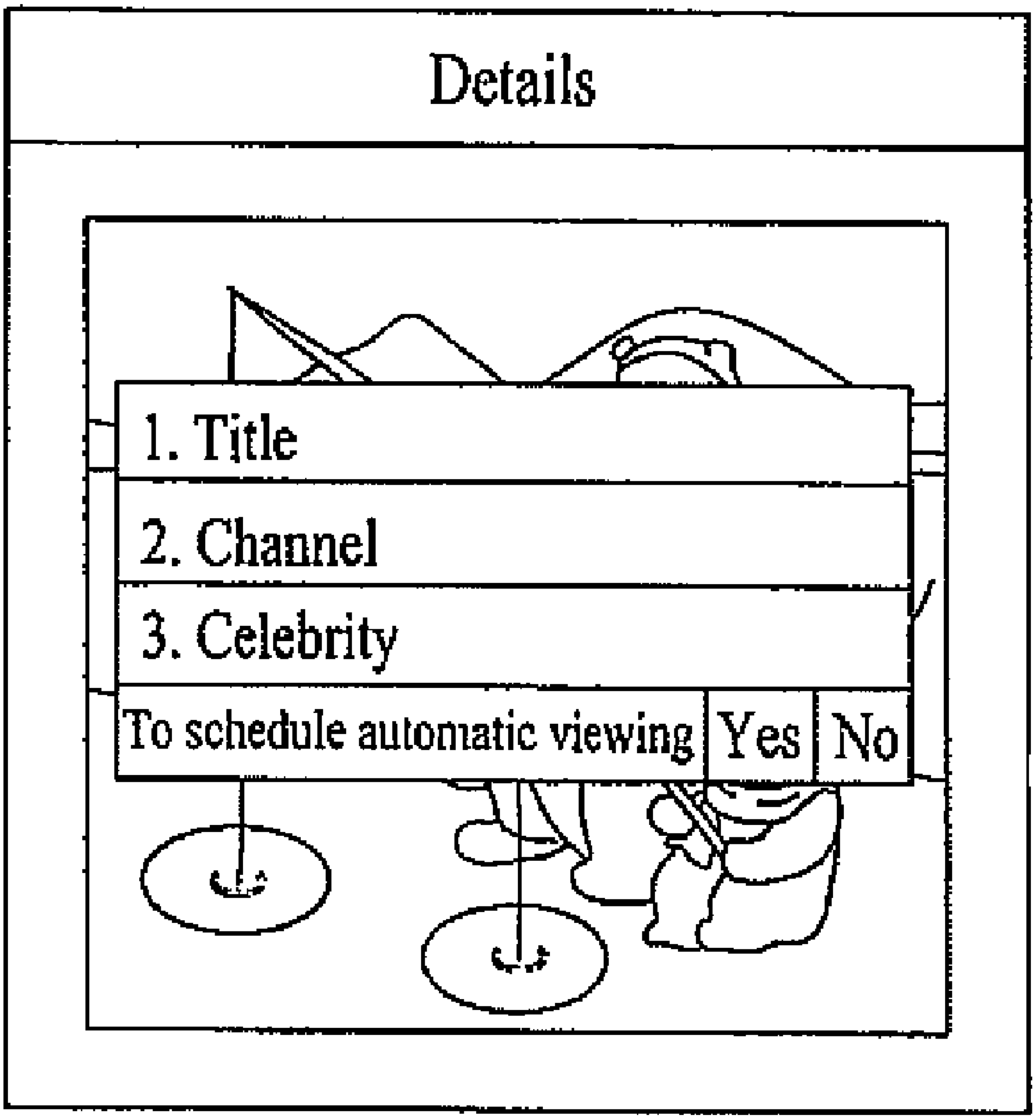

As shown in FIG. 5D, the controller 170 then displays the retrieved broadcast program information on the display unit 160, such as the title and the broadcast time of the corresponding broadcast program (S406), and also prompts the user to ask them if they want to schedule an automatic viewing of the corresponding broadcast program. Here, if the user selects or touches the input option 530 to view details about the broadcast program, the controller 170 displays on the display 160 details of the broadcast program contained in the EPG as shown in FIG. 5E.

Further, in FIG. 4, the controller 170 also outputs a notification sound stored in the memory 130 to notify the user about the presence of the retrieved broadcast program through the audio output unit 150 (S407). The controller 170 may also convert the retrieved broadcast program information into speech through the TTs module 140 and output the converted speech through the audio output unit 150 (S408).

SECOND EMBODIMENT

Figure 6:
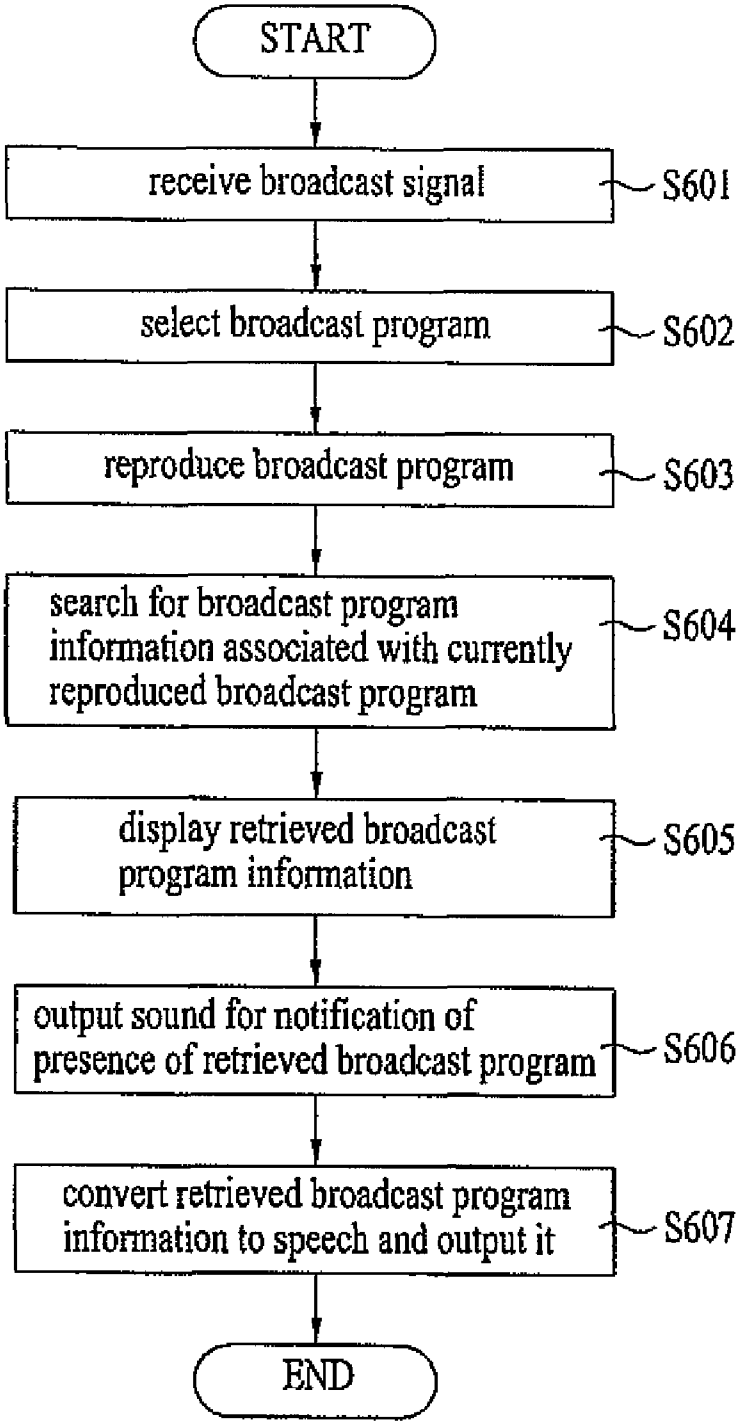
FIG. 6 is a flowchart illustrating a method of notifying a user about an upcoming favorite broadcast program according to an embodiment of the present invention.

FIG. 6 is a flowchart illustrating a method of notifying a user about an upcoming favorite broadcast program according to an embodiment of the present invention, and FIGS. 7A-7D illustrate example screenshots of a broadcast terminal notifying a user about an upcoming favorite broadcast program according to an embodiment of the present invention. These figures as well as FIG. 1 will be referred to in describing the second embodiment of the present invention.

Figure 7A:
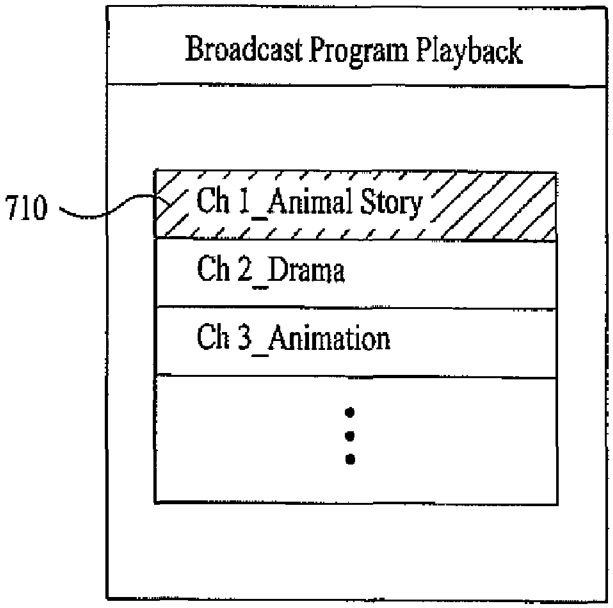
FIGS. 7A-7D illustrate example screenshots of a broadcast terminal notifying a user about an upcoming favorite broadcast program according to an embodiment of the present invention.

As shown in FIG. 6, the controller 170 controls the broadcast receiver 100 to receive the broadcast signal (S601), displays a list of available broadcasts, and reproduces a selected broadcast (S602 and S603). These steps are similar to steps S201-S203 in FIG. 2. In more detail, the controller 170 displays a list of available broadcasts as shown in FIG. 7A, and the user selects the program "Ch 1_Animal Story" 710. The controller 170 then reproduces the program "Ch 1_Animal Story" 710 as shown in FIG. 7B.

Figure 7B:
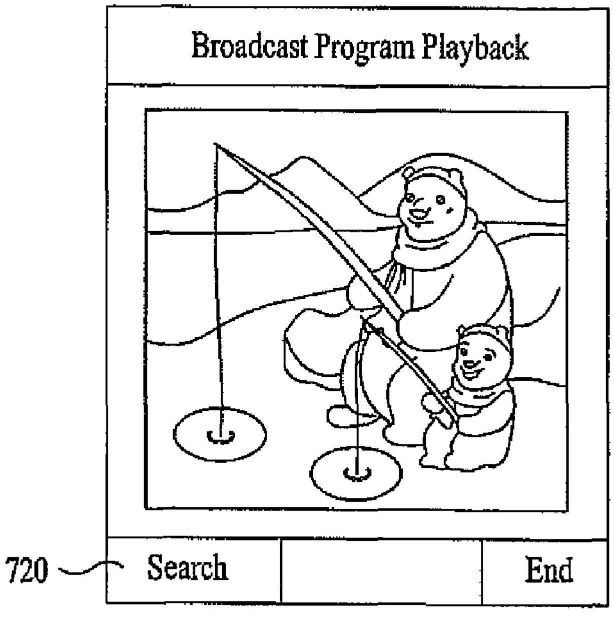
Figure 7C:
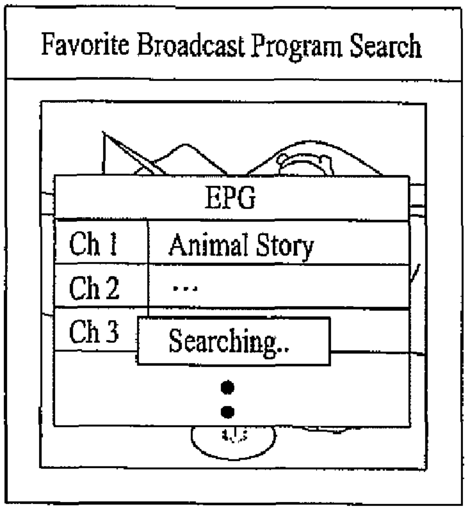

Thereafter, if the user selects the search key 720 in FIG. 7B to search for broadcast program information associated with the program "Ch 1_Animal Story" 710, the controller 170 searches for broadcast program information associated with the program "Ch 1_Animal Story" 710 in the received EPG as shown in FIG. 7C (S604). More specifically, the controller 170 searches for broadcast program information including at least one of the title, broadcast time, and celebrity or personality of the program "Ch 1_Animal Story" 710 in a plurality of broadcast program information in the EPG, thereby retrieving broadcast program information corresponding to a rerun or any other available episode of the program "Ch 1_Animal Story" 710.

Figure 7D:
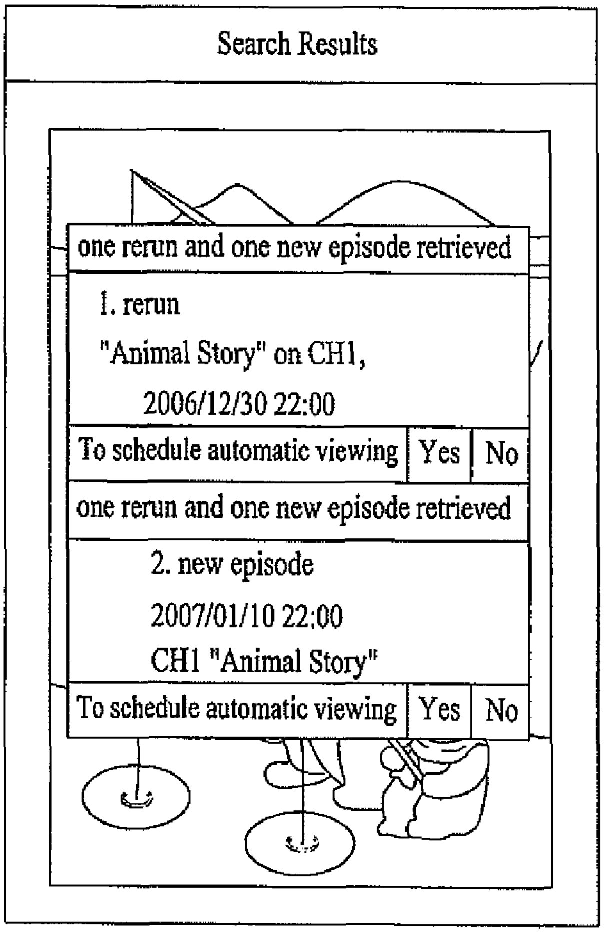

The controller 170 then displays the retrieved broadcast program information on the screen of the display unit 160 as shown in FIG. 7D (S605). In FIG. 6, the controller 170 also outputs a stored notification sound or alarm signal via the audio output unit 150 to notify the user of the presence of the retrieved broadcast program through the audio output unit 150 (S606). However, this step may be omitted or turned off by the user.

In FIG. 6, the controller 170 also converts the retrieved broadcast program information to speech through the TTs module 140 and outputs the converted speech through the audio output unit 150 (S607). This step may also be omitted or turned off by the user. Further, as shown in FIG. 7D, the user may also schedule an automatic viewing of the broadcast programs included in the retrieved broadcast program information.

Further, in one embodiment, when a broadcast program is currently being displayed on the display 160, the controller 170 performs one of automatically switching to displaying the selected favorite broadcast program on the display 160 at the time indicated in the extracted broadcast program information, and prompting a user to determine if the controller 170 should automatically switch to displaying the selected favorite broadcast program on the display 160 at the time indicated in the extracted broadcast program information.

In addition, in an alternative embodiment, when a broadcast program is currently being displayed on the display 160, the controller 170 splits a screen of the display 160 into first and second portions, and displays the current broadcast program in the first portion and displays the favorite broadcast program (e.g., another episode of the broadcast program) in the second portion. Further, the controller 170 controls the broadcast receiver 110 to receive a broadcast program that corresponds to the favorite broadcast program in which the favorite broadcast program corresponds to one of a rerun and any other available episode of the favorite broadcast program.

As is apparent from the above description, the present invention provides a broadcast terminal and corresponding favorite broadcast program notification method that allows the user to confirm information about their favorite broadcast program during reproduction of a broadcast, thereby eliminating the need for the user to manually search for a frequently viewed broadcast program in an EPG each time they want to view it.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a broadcast mobile terminal, the method comprising:

receiving, by the broadcast mobile terminal, an Electronic Program Guide (EPG) including broadcast program information about a plurality of broadcast programs;

displaying, by the broadcast mobile terminal, the EPG;

receiving, by the broadcast mobile terminal, a touch input to the EPG for selecting a broadcast program from the EPG;

in response to the touch input to the EPG for selecting a broadcast program from the EPG, displaying, by the broadcast mobile terminal, the broadcast program corresponding to the touch input to the EPG, and displaying, by the broadcast mobile terminal, a registration icon while displaying the broadcast program, the registration icon displayed in a display area below a display area of the displayed broadcast program;

receiving, by the broadcast mobile terminal, a touch input to the registration icon;

in response to the touch input to the registration icon, displaying, by the broadcast mobile terminal, information about the broadcast program, the information being an overlay displayed in the display area of the selected broadcast program, the information including at least a program title, a program broadcast time, and program personality information, and displaying, by the broadcast mobile terminal, a save icon in the display area below the display area of the displayed broadcast program;

receiving, by the broadcast mobile terminal, a touch input to the information about the broadcast program, in response to the touch input to the information about the broadcast program, displaying, by the broadcast mobile terminal, an information edit window enabling a user to edit the information about the broadcast program;

receiving, by the broadcast mobile terminal, a touch input to the save icon; and in response to the touch input to the save icon, registering, by the broadcast mobile terminal, the broadcast program with favorite program status, saving, by the broadcast mobile terminal, the information about the broadcast program, and displaying, by the broadcast mobile terminal, a notice over the broadcast program indicating that the broadcast program has been registered with favorite program status;

displaying, by the broadcast mobile terminal, a broadcast program playback list over the broadcast program, the broadcast program playback list including a channel search icon, a channel change icon and a favorite broadcast program search icon;

receiving, by the broadcast mobile terminal, a touch input to the favorite broadcast program search icon;

in response to the touch input to the favorite broadcast program search icon, displaying, by the broadcast mobile terminal, a list of previously registered favorite programs;

receiving, by the broadcast mobile terminal, a touch input to a program in the list of previously registered favorite programs; and in response to the touch input to the program in the list of previously registered favorite programs, displaying, by the broadcast mobile terminal, first stored information about the program in the list of previously registered favorite programs, the first stored information retrieved from a memory of the broadcast mobile terminal and overlaid on the broadcast program, displaying, by the broadcast mobile terminal, an automatic viewing option icon with the first stored information, and displaying, by the broadcast mobile terminal, a detailed information selection icon in the display area below the display area of the displayed broadcast program.

2. The method of claim 1, wherein the step of receiving the touch input to the information about the broadcast program includes changing the information about the broadcast program in response to a user edit command, and wherein the step of saving the information about the broadcast program includes saving the changed information about the broadcast program.

3. The method of claim 1, further comprising:

receiving, by the broadcast mobile terminal, a touch input to the automatic viewing option icon; and in response to the touch input to the automatic viewing option icon, scheduling, by the broadcast mobile terminal, an automatic viewing of the program in the list of previously registered favorite programs in response to user supplied schedule information.

4. The method of claim 1, further comprising:

receiving, by the broadcast mobile terminal, a touch input to the detailed information selection icon; and in response to the touch input to the detailed information selection icon, displaying, by the broadcast mobile terminal, the information about the broadcast program, and displaying, by the broadcast mobile terminal, the automatic viewing option icon with the information about the broadcast program.

5. The method of claim 4, further comprising:

receiving, by the broadcast mobile terminal, a touch input to the automatic viewing option icon; and in response to the touch input to the automatic viewing option icon, scheduling, by the broadcast mobile terminal, an automatic viewing of the program in the list of previously registered favorite programs in response to user supplied schedule information.

6. The method of claim 1, wherein the first stored information includes information about a previously broadcast episode of the program in the list of previously registered favorite programs and information about a future episode of the program in the list of previously registered favorite programs.

7. The method of claim 6, wherein the automatic viewing option Icon comprises an automatic viewing option icon corresponding to the previously broadcast episode and an automatic viewing option icon corresponding to the future episode.

8. A broadcast mobile terminal, comprising:

a broadcast receiver;

a memory;

a display including a touch input device; and a controller operatively connected to the broadcast receiver, the memory and the display, the controller configured to receive an Electronic Program Guide (EPG) including broadcast program information about a plurality of broadcast programs;

display the EPG;

receive a touch input to the EPG for selecting a broadcast program from the EPG;

in response to the touch input to the EPG, display the broadcast program corresponding to the touch input to the EPG, and display a registration icon while displaying the broadcast program, the registration icon displayed in a display area below a display area of the displayed broadcast program;

receive a touch input to the registration icon;

in response to the touch input to the registration icon, display information about the broadcast program, the information being an overlay displayed in the display area of the selected broadcast program, the information including at least a program title, a program broadcast time, and program personality information, and display a save icon in the display area below the display area of the displayed broadcast program;

receive a touch input to the information about the broadcast program, in response to the touch input to the information about the broadcast program, display an information edit window enabling a user to edit the information about the broadcast program;

receive a touch input to the save icon; and in response to the touch input to the save icon, register the broadcast program with favorite program status, save the information about the broadcast program, and display a notice over the broadcast program indicating that the broadcast program has been registered with favorite program status;

display a broadcast program playback list over the broadcast program, the broadcast program playback list including a channel search icon, a channel change icon and a favorite broadcast program search icon;

receive a touch input to the favorite broadcast program search icon;

in response to the touch input to the favorite broadcast program search icon, display a list of previously registered favorite programs;

receive a touch input to a program in the list of previously registered favorite programs; and in response to the touch input to the program in the list of previously registered favorite programs, display first stored information about the program in the list of previously registered favorite programs, the first stored information retrieved from the memory of the broadcast mobile terminal and overlaid on the broadcast program, display an automatic viewing option icon with the first stored information, and display a detailed information selection icon in the display area below the display area of the displayed broadcast program.

9. The broadcast mobile terminal of claim 8, wherein the controller is further configured to change the information about the broadcast program in response to a user edit command, and save the changed information about the broadcast program.

10. The broadcast mobile terminal of claim 8, wherein the controller is further configured to receive a touch input to the automatic viewing option icon; and in response to the touch input to the automatic viewing option Icon, schedule an automatic viewing of the program in the list of previously registered favorite programs III response to user supplied schedule information.

11. The broadcast mobile terminal of claim 8, wherein the controller is further configured to receive a touch input to the detailed information selection icon; and in response to the touch input to the detailed information selection icon, display the information about the broadcast program, and display the automatic viewing option icon with the information about the broadcast program.

12. The broadcast mobile terminal of claim 11, wherein the controller is further configured to receive a touch input to the automatic viewing option icon; and in response to the touch input to the automatic viewing option Icon, schedule an automatic viewing of the program in the list of previously registered favorite programs in response to user supplied schedule information.

13. The broadcast mobile terminal of claim 8, wherein the first stored information includes information about a previously broadcast episode of the program in the list of previously registered favorite programs and information about a future episode of the program in the list of previously registered favorite programs.

14. The broadcast mobile terminal of claim 13, wherein the automatic viewing option icon comprises an automatic viewing option icon corresponding to the previously broadcast episode and an automatic viewing option icon corresponding to the future episode.

* * * * *